Jan. 16, 1940.  W. HESS  2,187,496
ADDING AND SUBTRACTING DEVICE
Filed Sept. 20, 1938  4 Sheets-Sheet 1

INVENTOR.
WALTER HESS
BY
ATTORNEY.

Jan. 16, 1940.   W. HESS   2,187,496
ADDING AND SUBTRACTING DEVICE
Filed Sept. 20, 1938   4 Sheets-Sheet 2
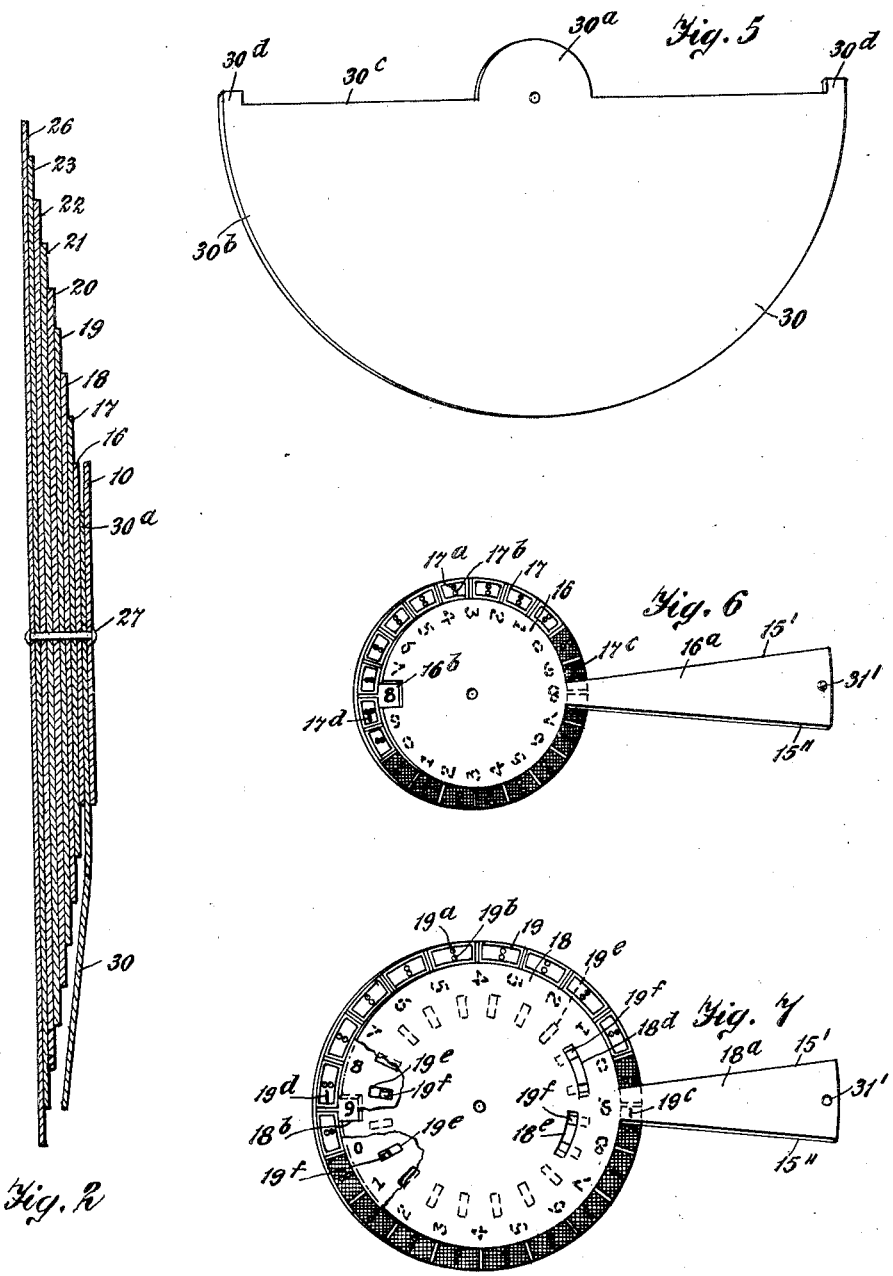
INVENTOR.
WALTER HESS
BY
ATTORNEY.

Jan. 16, 1940.   W. HESS   2,187,496
ADDING AND SUBTRACTING DEVICE
Filed Sept. 20, 1938   4 Sheets-Sheet 3

INVENTOR.
WALTER HESS
BY Edward [signature]
ATTORNEY.

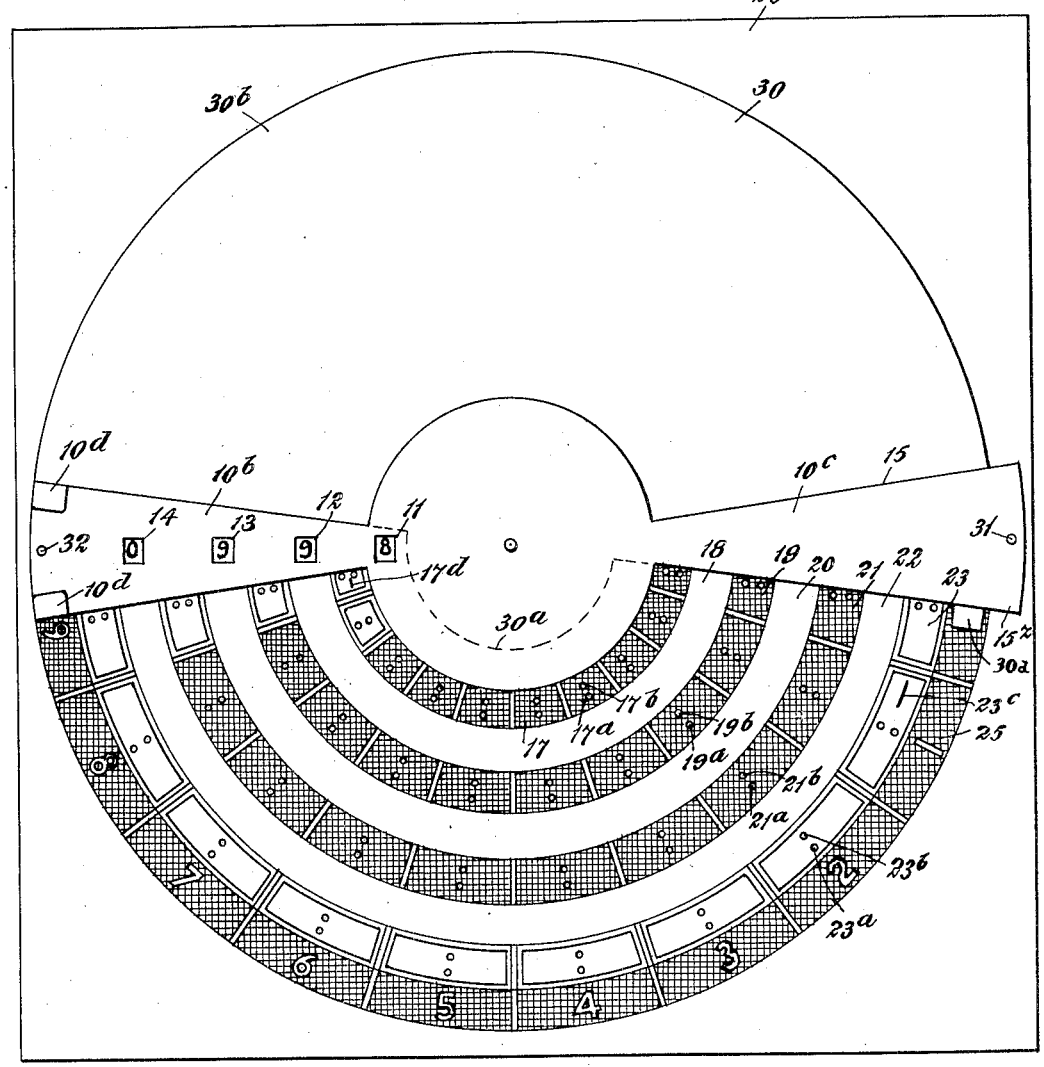

Patented Jan. 16, 1940

2,187,496

UNITED STATES PATENT OFFICE 2,187,496

ADDING AND SUBTRACTING DEVICE

Walter Hess, New York, N. Y., assignor of one-half to Edwin W. Hess, New York, N. Y.

Application September 20, 1938, Serial No. 230,771

10 Claims. (Cl. 235—78)

This invention relates to new and useful improvements in an adding and subtracting device.

The invention has for an object the construction of an article as mentioned which is characterized by a plurality of discs or members rotatively or movably mounted and representing units, tens, hundreds, thousands, etc., and an arrangement for mechanically manipulating said discs or members to add or subtract as desired.

The invention contemplates arranging the discs or members, respectively, progressively larger with edge portions thereof projecting and provided with two apertures for engagement by a pointed operator to operate the device. The invention contemplates the provision of signals associated with the discs to direct the proper selection of one or the other of the apertures for the proper operation of the article as hereinafter more fully described.

Still further the invention proposes the provision of shields interposed between the discs and provided with certain openings cooperative with the pointed operator to control certain movements of the discs.

Still further it is contemplated to provide a stationary member having a plurality of window openings for representing in succession, reading from right to left, units, tens, hundreds, thousands. etc., and arranged in a manner so that portions of the corresponding parts of the discs are viewable therethrough.

Furthermore the invention proposes the provision of an abutment edge adapted to arrest the motion of the pointed operator to control the proper positioning of the discs.

Another object of this invention resides in providing equal radial sections upon the peripheral areas of the various discs numbered from 1 to 9 and then zero, and arranged so that one number at a time for each disc is viewable through the window openings previously referred to. It is also contemplated to provide a stationary area in radial relationship with said equal radial sections and numbered with the digits to instruct the proper movement of the various discs as hereinafter more fully described.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

Fig. 2 is a vertical sectional view taken on the line 2—2 of Fig. 1.

Fig. 5 is a perspective view of an opaque top shield used in the device.

Fig. 6 is a perspective view of a unit shield and a unit disc of the device.

Fig. 7 is a perspective view of the ten's shield and the ten's disc used in the device, portion of the shield being broken away to disclose portions of the disc.

Fig. 11 is a front elevational view of Fig. 1 but showing the device set for subtracting.

Figures 1, 4:
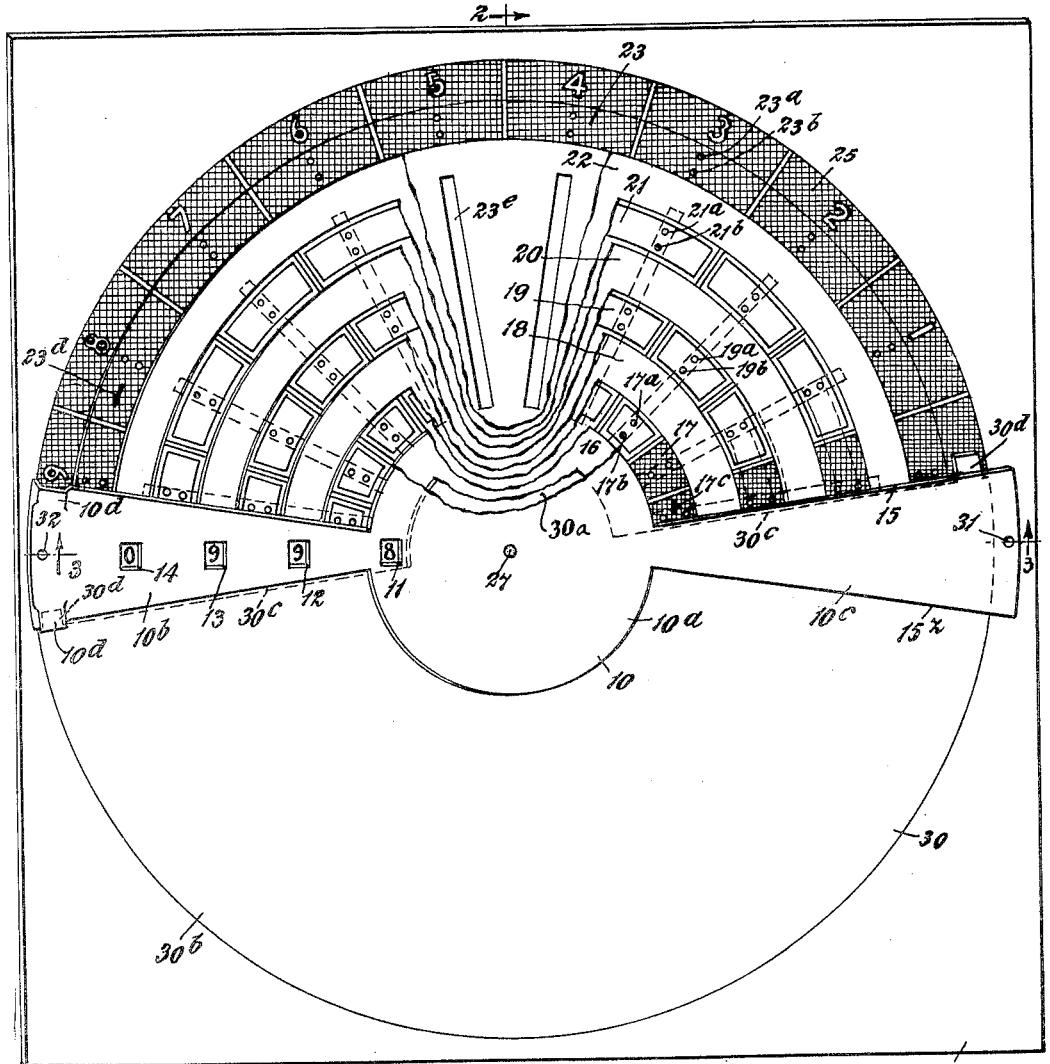
Fig. 1 is a perspective view of an adding and subtracting device constructed according to this invention, with portions thereof broken away to disclose other parts.
Fig. 4 is a perspective view of the stationary member with the window openings used in the device.
Figure 8:
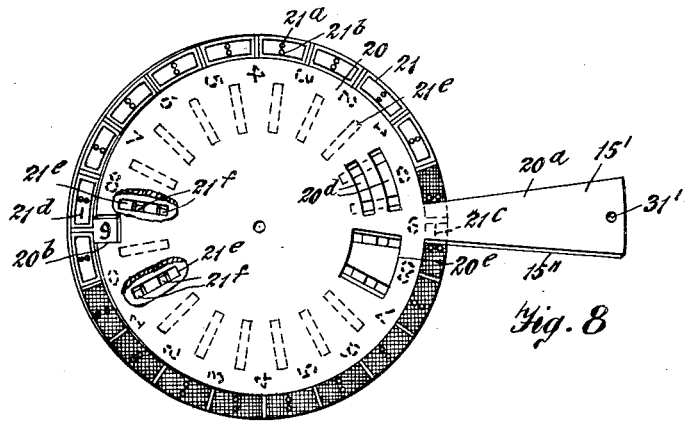
Fig. 8 is a perspective view of the hundred's shield and the hundred's disc of the device, portion of the shield being broken away to disclose portions of the disc.

The adding and subtracting device, according to this invention, includes a stationary member 10 having a plurality of window openings 11, 12, 13, 14, for representing in succession, reading from right to left, units, tens, hundreds and thousands. While only four such window openings have been shown it should be borne in mind that any additional number may be used providing the device is equipped with additional discs and shields as hereinafter more fully explained. The device will then be capable of handling tens of thousands, hundreds of thousands, etc.

The stationary member 10 is also provided with an abutment edge 15 against which a pointed operator engages during the turning of the discs. The central portion of the stationary member 10 is provided with a circular section 10a. Beneath this circular section there is a stationary unit's shield 16. Additional discs and shields are arranged beneath the unit's shield and these parts are progressively larger in diameter.

Directly beneath the units shield 16 there is a unit disc 17, a ten's shield 18, a ten's disc 19, a hundred's shield 20, a hundred's disc 21, a thousand's shield 22, and a thousand's disc 23. The capacity of the device may be increased by the mere addition of additional shields and discs. In such event the device will be capable of handling numbers in the ten thousands, hundred thousands, etc.

Beneath the lowermost disc, the thousand's disc 23, there is a stationary area of numbers 25 arranged in a circle around the edge portion of the thousand's disc 23. This arrangement of numbers 25 may be imprinted upon a stationary top board 26 or other suitable element. A pintle rivet 27 or other suitable pintle is engaged through the centers of the stationary member 10 and the various shields and discs. This pintle 27 serves to rotatively support the discs. The shields are stationarily held by side arms as will be hereinafter more fully explained.

The stationary member 10, in addition to having the central circular portion 10a has diametrically opposite wing portions 10b and 10c. One of these wing portions, the portion 10b, is provided at its extremity along the top and bottom edges, with outwardly embossed areas 10d. A top opaque shield 30 has a central semi-circular area 30a of a diameter substantially equal to the diameter of the circular area 10a of the top stationary member. The shield 30 includes another and much larger semi-circular portion 30b extended in the opposite direction to the semi-circular area 30a. This larger portion 30b is adapted to cover the bottom halves of all of the exposed portions of the discs and the area of numbers 25. Along the edges 30c the top shield 30 is provided with small projections 30d at the ends thereof. One of the projections 30d normally engages in the bottom pocket 10d of the stationary member 10. The device, when in this condition, is used for addition. To use the device for subtraction it is possible to turn the top shield 30 around through substantially 180° so that the other projection 30d engages in the top pocket 10d. The device in this condition is shown in Fig. 11 and is now ready to be used for subtraction.

The right hand wing 10c of the stationary member 10 projects past the peripheral edge of the top shield 30. A pin or other fastening element 31 engages through the extended end of the wing 10c and connects with the board 26 to hold the stationary member 10 in a stationary position. Another pin 32 engages through the wing 10b and connects with the board 26 for holding the wing 10b down at its outer end. It should be noted that the fastening element 32 does not interfere with the turning of the thousand's disc 23 which is immediately adjacent.

The stationary units shield 16 is provided with a wing 16a disposed beneath the wing 10c and formed with an opening 31' through which the fastening element 31 engages. Thus the units shield 16 is held stationary. The units shield is also provided with a window cutout 16b which exposes one number of a plurality of numbers arranged in a circle upon the units disc. This circle of numbers is arranged immediately beneath the edge portion of the units shield 16 so that all the numbers are hidden, except the one number which is viewable through the window opening 16b. This window opening is in line with the window opening 11 so that the units number is viewable through the window opening 11. The units disc 17 has a peripheral area which projects from the edge portion of the units shield 16. This peripheral area is divided into equal radial sections consecutively numbered from 1 to 9 and zero, and then repeated from 1 to 9 and zero. The arrangement is such that through 180°, that is half of the units disc, the numbers range from 1 to 9 and zero, and the other half is similarly numbered.

The projecting peripheral area of the units disc 17 is divided into radial sections, there being one section for each of the numbers on this disc. Each of these radial sections is formed with two apertures, 17a and 17b. These apertures are arranged on slightly different diameters. All of the apertures 17a are upon the circumference of an imaginary larger circle than the apertures 17b which are on the circumference of an imaginary smaller circle.

The radial sections representing one half of the disc are of one color, for example white, while the other radial sections representing the numbers 1 to 9 and zero on the other half of the disc is another color, for example black. In Fig. 6 the radial sections intended to be black are cross hatched to show the black. In addition two of the radial sections are formed with a signal mark. This mark consists of a minus sign 17c imprinted on the radial section representing the black 9, and a minus sign 17d imprinted on the radial section representing the white 9. When the radial sections with these minus signs are against the abutment edge 15 the numbers 9 will be viewable through the window openings 11.

The stationary ten's shield 18 is formed with a wing portion 18a of a size to be disposed beneath the wing 10c of the stationary member. This wing 18a is formed with an opening 31' through which the fastening element 31 passes so that the ten's shield is held stationary. The ten's shield 18 is also formed with a window opening 18b through which one number of a plurality of numbers arranged on a circle of the ten's disc 19 may be viewed. These numbers on the ten's disc range from 1 to 9 and zero extending through 180°, and then repeat on the other 180°. The ten's disc 19 is arranged so that these numbers are normally hid beneath the peripheral area of the ten's shield 18, except one number at a time, which is viewable through the window opening 18b.

The ten's disc 19 is provided with a peripheral area which projects from the peripheral edge of the ten's shield 18. The ten's shield is of a slightly larger diameter than the units disc 17 and therefore there is a projecting peripheral edge. The window opening 18b is arranged so that the number viewable through this window is exposed through the window opening 12. The ten's disc 19 has a peripheral area which is divided into equal radial sections, one section for each of the numbers on this disc. Each of these radial areas is provided with two apertures. There is an outside aperture 19a and an inside aperture 19b. All the apertures 19a are arranged on a circle slightly larger than the apertures 19b. The projecting radial sections of the disc representing the numbers 1 to 9 and zero is white, while the other area representing the other numbers 1 to 9 and zero is black. In Fig. 11 the sections are appropriately cross hatched to indicate the black.

A signal element is imprinted on the projecting radial areas corresponding with the signal elements 17c and 17d. There is a signal element 19d on the white sections representing the 9, and a signal element 19c on the black sections representing the other 9. The ten's disc 18 is formed with a plurality of radial grooves 19e there being one groove for each number. The grooves 19e do not extend completely through the material of the ten's disc, as will be explained relative to Fig. 10, which shows one of the discs in section. However, certain of the radial grooves 19e are formed with openings 19f extended from the bases of the grooves completely through the material of the grooves. The ten's disc 19 is formed with four such openings. Two of the openings 19f are arranged upon an inner diameter and represent the two numbers 9. The other two openings 19f are arranged upon a slightly larger diameter and also represent the two numbers 9.

The ten's shield 18 is formed with an arcuate slot 18d extending from the abutment edge 15' back for a distance of one number. The ten's shield 18 is formed with another arcuate slot 18e formed upon the smaller diameter extending from the abutment edge 15" back one number. The edge 15' corresponds with the edge 15 since it is constructed to lay beneath it. The wing 18c has an additional abutment edge 15z. This additional edge is used for subtraction. The edge 15z corresponds with the edge 15". The arcuate slots 18d and 18e are arranged on the identical circles as the circles of openings 17a and 17b of the units disc.

The hundred's shield 20 is formed with a right wing portion 20a having an abutment edge 15' at the top of the wing and another abutment edge 15" at the bottom of the wing. At the outer end the wing 20a is formed with an opening 31' for receiving the fastening element 31. This serves to hold the hundred's shield 20 stationary. The hundred's shield is formed with a window opening 20b aligned with the window opening 13 of the stationary member 10. The hundred's disc 21 is formed with a circle of numbers selectively viewable through the window opening 20b. These numbers range from 1 to 9 and zero on 180° of the disc, and then repeat from 1 to 9 and zero on the remaining 180° of the disc. For each number there is an outer radial section formed on the disc. Each of these radial sections is provided with a pair of openings, an outer opening 21a and an inner opening 21b. These openings are arranged on the circumferences of circles. The extended radial sections representing numbers 1 to 9 and zero are white, while the other radial sections representing the other numbers 1 to 9 and zero are imprinted black.

A signal mark 21c and 21d are imprinted upon certain of the radial sections to represent the two 9's. For each radial section upon the hundred's disc there is a radial groove 21e. These grooves are formed on the top face of the disc and do not extend through the disc. However, certain of these grooves are formed with openings 21f extending completely through the disc. These openings 21f are arranged in the radial grooves representing the 9's. Each of the radial grooves 21e which are formed with the openings 21f are formed with two of these openings. These openings 21f are formed on different diameters to show beneath certain of the openings in the units and ten's discs.

The hundred's shield 20 is formed with two arcuate slots 20d extending backwards from a radial line in line with the abutment edge 15' and arranged upon a diameter to correspond with the circle of openings 19a and 17a. The hundred's shield 20 is also formed with a wide arcuate opening 20e extending backwards from a radial line in line with the abutment edge 15". This arcuate opening 20e is of a width corresponding with the width of the radial grooves 21e. These radial grooves are of a width extending from the inner points of the radial grooves 19e to the outer edge of the outer arcuate slot 20d.

The thousand's shield 22 is also formed with a wing portion 22a having an abutment edge 15' at its top and an abutment edge 15" at its bottom. This wing 22a also is formed with an opening 31' through which the fastening element 31 passes. This serves to hold the shield stationary. The thousand's shield 22 is formed with a window opening 22b normally in line with the thousand's window opening 14 in the stationary member 10. The thousand's disc 23 is formed with a ring of numbers running from 1 to 9 and zero and extending over 180° of its compass, and then repeating for the 180°. These numbers are selectively viewable through the window opening 22b. For each number there is an outer radial section which extends outwards from the edge of the shield 22. The numbers are arranged beneath the edge portion of the shield so that they are hid, except for the one number which is viewable through the window opening. Each of the outer radial areas is formed with a pair of apertures. There is an outer aperture 23a and an inner aperture 23b. The outer apertures are arranged along the circumference of a large circle and the inner apertures are arranged on the circumference of a smaller circle. The outer radial sections represent the numbers 1 to 9 and zero are white, while the other radial sections representing the other numbers 1 to 9 and zero are black.

Certain of these sections are provided with segmental elements 23c and 23d for representing the two 9's. On the top face the thousand's disc 23 is formed with a radial groove 23e, one groove for each number. These grooves extend the full length from a circle of the same diameter as the inner ends of the radial grooves 19e, to a circle of a slightly larger diameter than the diameter of the circle having the openings 21a. The grooves 23e do not extend through the material of the disc 23. Certain of these grooves however are formed with openings 23f which extend from the bases of the grooves through the material of the discs. These openings 23f are formed in the grooves representing the 9's and the zeros.

The thousand's shield 22 is formed with an arcuate slot 22d extended backwards for one number from the abutment edge 15' and upon a diameter beneath the circle of the openings 21a.

The disc 22 is also formed with a wide arcuate opening 22dd of a width extending back to the diameter of the arcuate opening 18d. This opening 22dd extends backwards from the abutment edge 15' to a distance representing one number. The shield 22 is also formed with an arcuate opening 22e extending backwards from the abutment edge 15" for a distance of one number. This opening 22e is of a width extending from the smallest circle of the openings 17b to the inner edge of the opening 22d.

Figure 10:
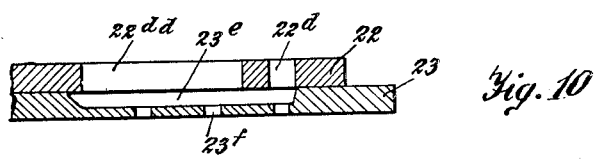
Fig. 10 is a fragmentary sectional view taken on the line 10—10 of Fig. 9.
Figure 9:
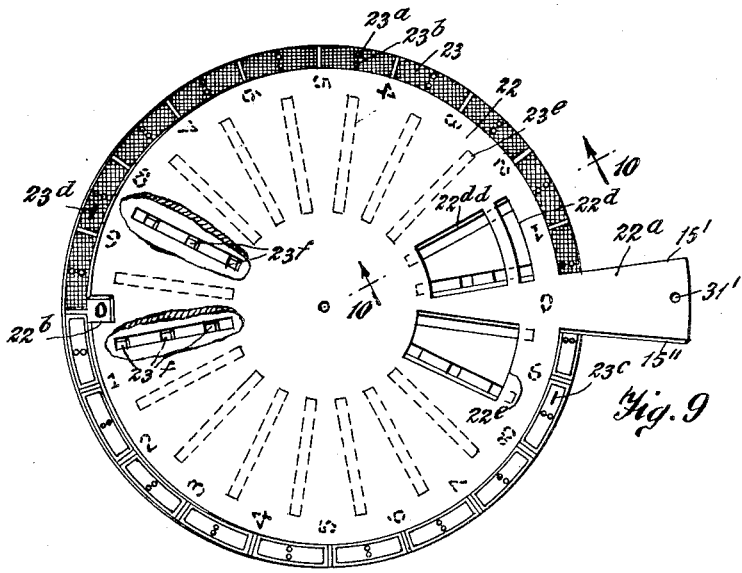
Fig. 9 is a perspective view of the thousand's shield and the thousand's disc of the device, with portions of the shield broken away to disclose portions of the disc.
Figure 3:
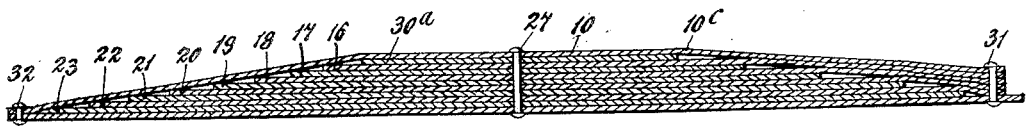
Fig. 3 is a horizontal sectional view on the line 3—3 of Fig. 1.

In Fig. 10 a sectional view is shown of the shield 22 and the disc 23. From this sectional view it may readily be seen that the grooves 23e do not extend through the material of the disc 23. It will also be noted that the openings 23f extend from the bottom of the grooves through the material of the disc.

From the disclosure up to this point it will be seen that the shields and disc are increasing progressively in diameter and are formed with similar slots. To increase the capacity of the adding device it is merely necessary to add additional shields and discs to represent the ten thousands, hundred thousands, etc. From the description up to this point it is believed that anyone skilled in the art will be able to construct the additional discs and shields necessary.

The stationary area 25 is divided into radial sections extending from zero and 1 to 9 on the top half going backwards from the lead edge 15, and from zero to 1 to 9 on the bottom half extending backwards from the lead edge 15z.

A careful inspection of Fig. 1 will show that the various radial grooves formed in the tens, hundreds and thousands discs are in line with the apertures formed in the units, tens, hundred and thousands discs when the device is properly set. Furthermore, all of the radial areas are in true radial positions.

The operation of the device is as follows:

In order that the operation may be easily understood the device in Fig. 1 is shown to be set for addition and is shown to be set on the number 998. The object of using this number is that it is easy enough to add simple numbers and point out how the various parts function. A simple rule must be remembered to add correctly. The rule is that when a figure is to be added it is required that a pointed implement be inserted in the innermost of the two apertures which appear in the radial section representing the number. But if there is a change of color of the radial sections, figuring rearwards from the lead edge 15, in order to properly add it is necessary that the pointed operator be engaged in the outer aperture representing the particular number to be added. The pointer, of course, must be moved clockwise towards the abutment edge 15.

Now for some concrete examples. Suppose it is required that 1 be added to the 998 now on the device. For this purpose the units disc 17 is used and a pointed implement is engaged in the innermost opening 17b in the radial section aligned with the number 1 formed on the outer stationary area of numbers 25. The pointed operator when engaged in this opening 17b and moved clockwise until the operator strikes the edge 15, will cause the units disc to turn one number so that the total will now be 999.

Again assuming the device set for 998. Suppose it is required that 2 be added to this quantity. The pointed operator must now be engaged in one of the openings of the unit disc which is in line with the numeral 2 on the stationary area of numbers 25. But since the pointer is now being engaged into a section which is white and the section immediately adjacent the edge 15 is black, it is required that the pointer be engaged in the outer of the two openings in the section, namely the opening 17a. When the pointer is engaged in this opening it will extend just through the opening 17a and rest against the tens shield 18. When one starts turning the disc clockwise the pointer will soon reach the slot 8d on the tens shield 18 and drop through the slot to engage through the opening 19f of the tens disc 19, and will furthermore engage through the innermost slot 20d of the hundreds shield 20 and through the opening 21f of the hundreds disc 21 and into the opening 22dd of the thousands shield 22 and into the groove 23e of the thousands disc 23. Consequently, when the motion continues to move the operator to the abutment edge 15 all of the disc 17, 19, 21 and 23 will be moved and the new result will be 1000.

As another example, suppose the device is again set for 998 and it is desired to add 10. To do this the pointed operator is engaged in one of the two apertures of the tens disc 19 in line with the numeral 1 on the stationary area 25. An examination of Fig. 1 discloses that there is a change of color from the area on this tens disc which is immediately below the abutment edge 15 to the area in line with the numeral 1. Consequently, it is required that the pointed operator be engaged into the outer one 19a of the two openings. When engaged into the opening 19a the pointer will extend through the outer arcuate slot 20d of the hundreds shield 20 through the opening 21f of the hundreds disc 21, through the opening 22d of the thousands shield 22, and into the groove 23e of the thousands disc 23. When the operator is now moved the units disc 17 will not be disturbed, so the number will remain at 8. But the tens disc, the hundreds disc and the thousands disc will be moved to produce a grand total of 1008.

Now considering a case of subtraction, and again considering the device set at 998, it is first necessary that the top shield 30 be moved through substantially 180° so that the projection 30a at the right engages the uppermost pocket 10d of the stationary member 10. The device is illustrated in this condition in Fig. 11. In order to subtract a simple rule must be remembered. Normally, the outer one of the two apertures in each radial section must be used, except if there is a section containing one of the minus signs upon the number to be subtracted, or towards the left of the number. For example, the number is now 998 on the device. If it is desired to subtract 1, the pointed operator is engaged in the section in the radial line with the 1 on the units disc 17, and more specifically, through the outer opening 17a in this section. The operator is then moved anti-clockwise until it strikes the abutment edge 15z. Since the operator is running along a smooth portion of the ten shield 18, only the unit disc 17 will move one number backwards and the result will be 997.

However, if it is desired to subtract 9 from the original sum of 998, the pointed operator must be engaged in the radial section on the units disc which is in radial line with the number 9 on the stationary area 25. But since this particular section contains a minus sign the pointed operator must be engaged in the innermost aperture of the two apertures, namely the aperture 17b. Now when the operator is moved anti-clockwise it will run along the tens shield 18 until it reaches the slot 18e. Then it will fall into this slot, and particularly into one of the radial grooves 19e and its disc 19. Further turning will turn both the unit and the tens disc, and when the operator reaches the abutment edge 15z the answer will be 989.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim and desire to secure by United States Letters Patent is:

1. In an adding and subtracting device, a movable member having numbered member sections representing the tens digits and in its top face having a longitudinally extending groove for each digit with an opening on a certain line within one of said grooves passing through the member, stationary shields on the top and bottom sides of said member and having a transverse slot each on said certain line of a length equal to one of said digit sections, a movable member on the top of said top shield and having numbered equal sections representing the units digits, each section having a pair of apertures one of which is on said certain line, and a movable member on the bottom of said bottom shield and having numbered equal sections representing the hundreds digits and in its top face having a longitudinal groove for each digit, whereby a pointed operator may be engaged in one of said apertures for moving the top member for adding or subtracting units or it may be engaged in the other of said apertures for moving the top member until the operator reaches the transverse slot in the top stationary shield and then engages one groove of said central member for moving the top and central members for adding or subtracting units and tens or it may be engaged through the latter aperture through the opening in the center member and into one groove of the bottom member for moving all simultaneously for adding or subtracting units, tens and hundreds.

2. In an adding and subtracting device, a rotatable disc having numbered equal radial sections representing the tens digits and in its top face having a radial groove for each digit with an opening on a certain radius within one of said grooves passing through the disc, stationary shields on the top and bottom sides of said disc and having an arcuate slot each on said certain radius of a length equal to one of said digit sections at that radius, a rotatable disc on the top of said top shield and having numbered equal radial sections representing the units digits, each section having a pair of apertures one of which is on said certain radius, and a rotatable disc on the bottom of said bottom shield and having numbered equal radial sections representing the hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, and said discs being in axially superimposed positions.

3. In an adding and subtracting device, a movable member having numbered equal radial sections representing the tens digits and in its top face having a radial groove for each digit with an opening on a certain radius within one of said grooves passing through the movable member, stationary shields on the top and bottom sides of said movable member and having an arcuate slot each on said certain radius of a length equal to one of said digit sections at that radius, a movable member on the top of said top shield and having numbered equal radial sections representing the units digits, each section having a pair of apertures one of which is on said certain radius, and a movable member on the bottom of said bottom shield and having numbered equal radial sections representing the hundreds digits and in its top face having a radial groove for each digit, whereby a pointed operator may be engaged in one of said apertures for moving the top movable member for adding or subtracting units or it may be engaged in the other of said apertures for moving the top movable member until the operator reaches the arcuate slot in the top stationary shield and then engages one groove of said central movable member for moving the top and central movable members for adding or subtracting units and tens or it may be engaged through the latter apertures through the opening in the center movable member and into one groove of the bottom movable member for moving all simultaneously for adding or subtracting units, tens and hundreds, and a pintle engaging through the apexes of the radial sections of said members.

4. In an adding and subtracting device, a rotatable disc having numbered equal radial sections representing the tens digits and in its top face having a radial groove for each digit with an opening on a certain radius within one of said grooves passing through the disc, stationary shields on the top and bottom sides of said disc and having an arcuate slot each on said certain radius of a length equal to one of said digit sections at that radius, a rotatable disc on the top of said shield and having numbered equal radial sections representing the units digits, each section having a pair of apertures one of which is on said certain radius, and a rotatable disc on the bottom of said bottom shield and having numbered equal radial sections representing the hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, and a member with an abutment edge against which a pointed operator which is engaged into said apertures may abut for stopping turning of the discs in a predetermined position.

5. In an adding and subtracting device, a rotatable disc having numbered equal radial sections representing the tens digits and in its top face having a radial groove for each digit with an opening on a certain radius within one of said grooves passing through the disc, stationary shields on the top and bottom sides of said disc and having an arcuate slot each on said certain radius of a length equal to one of said digit sections at that radius, a rotatable disc on the top of said shield and having numbered equal radial sections representing the units digits, each section having a pair of apertures one of which is on said certain radius, and a rotatable disc on the bottom of said bottom shield and having numbered equal radial sections representing the hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, and a member with an abutment edge against which a pointed operator which is engaged into said apertures may abut for stopping turning of the discs in a predetermined position, said slots in the shield being extended backwards from a line in line with said abutment edge.

6. In an adding and subtracting device, a rotatable disc having numbered equal radial sections representing the tens digits and in its top face having a radial groove for each digit with an opening on a certain radius within one of said grooves passing through the disc, stationary shields on the top and bottom sides of said disc and having an arcuate slot each on said certain radius of a length equal to one of said digit sections at that radius, a rotatable disc on the top of said top shield and having numbered equal radial sections representing the units digits, each section having a pair of apertures one of which is on said certain radius, and a rotatable disc on the bottom of said bottom shield and having numbered equal radial sections representing the hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, each of said discs having a peripheral edge portion imprinted with the numbers representing the digits representing the radial sections thereof.

7. In an adding and subtracting device, a rotatable disc having numbered equal radial sections representing the tens digits and in its top face having a radial groove for each digit with an opening on a certain radius within one of said grooves passing through the disc, stationary shields on the top and bottom sides of said disc and having an arcuate slot each on said certain radius of a length equal to one of said digit sections at that radius, a rotatable disc on the top of said top shield and having numbered equal radial sections representing the units digits, each section having a pair of apertures one of which is on said certain radius, and a rotatable disc on the bottom of said bottom shield and having numbered equal radial sections representing the hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, each of said discs having a peripheral edge portion imprinted with the numbers representing the digits representing the radial sections thereof, and each shield having a window opening for exposing one digit from its adjacent disc.

8. In an adding and subtracting device, a rotatable disc having two groups of numbered equal radial sections representing two groups of tens digits and in its top face having a radial groove for each digit with an opening for each group on a certain radius within one of said grooves of the group and passing through the disc, stationary shields on the top and bottom sides of said disc and having an arcuate slot each on said certain radius of a length equal to one of said digit sections at that point, a rotatable disc on the top of said top shield and having two groups of numbered equal radial sections representing two groups of units digits, each section having a pair of apertures one of which is on said certain radius, and a rotatable disc on the bottom of said bottom shield and having two groups of numbered equal radial sections representing two groups of hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, each disc having a peripheral edge portion imprinted with one group of the digits on 180°, and with the other group of digits imprinted on the other 180° of said discs, the radial sections representing the two groups of digits as being of different colors, and signals on certain of said sections to signal whether inner or outer apertures are to be used in the operation of the device.

9. In an adding and subtracting device, a rotatable disc having two groups of numbered equal radial sections representing two groups of tens digits and in its top face having a radial groove for each digit with an opening for each group on a certain radius within one of said grooves of the group and passing through the disc, stationary shields on the top and bottom sides of said disc and having an arcuate slot each for each group and on said certain radius of a length equal to one of said digit sections at that point, a rotatable disc on the top of said top shield and having two groups of numbered equal radial sections representing two groups of units digits, each section having a pair of apertures one of which is on said certain radius, and a rotatable disc on the bottom of said bottom shield and having two groups of numbered equal radial sections representing two groups of hundreds digits and in its top face having a radial groove for each digit, whereby a pointed operator may be engaged in one of said apertures for moving the top disc for adding or subtracting units or it may be engaged in the other of said apertures for moving the top disc until the operator reaches the arcuate slot in the top stationary shield and then engages one groove of said central disc for moving the top and central discs for adding or subtracting units and tens or it may be engaged through the latter aperture through the opening in the center disc and into one groove of the bottom disc for moving all simultaneously for adding or subtracting units, tens and hundreds, each disc having a peripheral edge portion imprinted with one group of the digits on 180°, and with the other group of digits imprinted on the other 180° of said discs, the radial sections representing the two groups of digits as being of different colors, and signals on certain of said sections to signal whether inner or outer apertures are to be used in the operation of the device, and a semi-circular top opaque shield movably mounted and adapted to cover up one group of said radial sections or the other group.

10. In an adding and subtracting device, a stationary member having a plurality of window openings for representing in succession reading from right to left units, tens, hundreds, thousands, and also having an abutment edge, a stationary units shield beneath said member and having a window opening aligned with said unit window opening, a unit disc turnably mounted and having a peripheral area with equal radial sections consecutively numbered from 1 to 9 and then zero arranged to be selectively viewable through said unit window opening and also having an outer peripheral area with radial sections adjacent to and corresponding with said radial sections and each outer radial sections having two apertures on different radial distances, a stationary tens shield beneath said unit disc and having a window opening aligned with said tens window opening and having an arcuate slot extending from said abutment edge one unit back along an arc on the same radius as one of said two apertures, a tens disc turnably mounted and having a peripheral area with equal radial sections consecutively numbered from 1 to 9 and then zero arranged to be selectively viewable through said tens window opening and also having an outer peripheral area with radial sections adjacent to and corresponding with said radial sections and each outer radial section having two apertures on different radial distances and furthermore having a shallow recess in its face adjacent said tens shield for each outer radial section of said unit disc and one of said shallow recesses representing zero on the tens disc at said abutment edge having an aperture completely through the disc at a radial distance of said arcuate slot in the tens shield, a stationary hundreds shield beneath said tens disc and having a window opening aligned with said hundreds window opening and having arcuate slots extending from said abutment edge one unit back along arcs on the same radii as one of the two apertures of the unit discs and the tens disc, and a hundreds disc turnably mounted and having a peripheral area with equal radial sections consecutively numbered from 1 to 9 and then zero arranged to be selectively viewable through said hundreds window opening and also having an outer peripheral area with radial sections adjacent to and corresponding with said radial sections and each outer radial section having two apertures on different radial distances and furthermore having a shallow recess in its face adjacent said hundreds shield for each outer radial section of said unit and tens discs and one of said shallow recesses representing zero on the tens and hundreds disc at said abutment edge having two apertures completely through the disc at a radial distance of said arcuate slots in the hundreds shield.

WALTER HESS.